Nov. 9, 1943.   C. P. DEMOND   2,333,988
LAND LEVELING APPARATUS
Filed Dec. 10, 1941   3 Sheets-Sheet 1
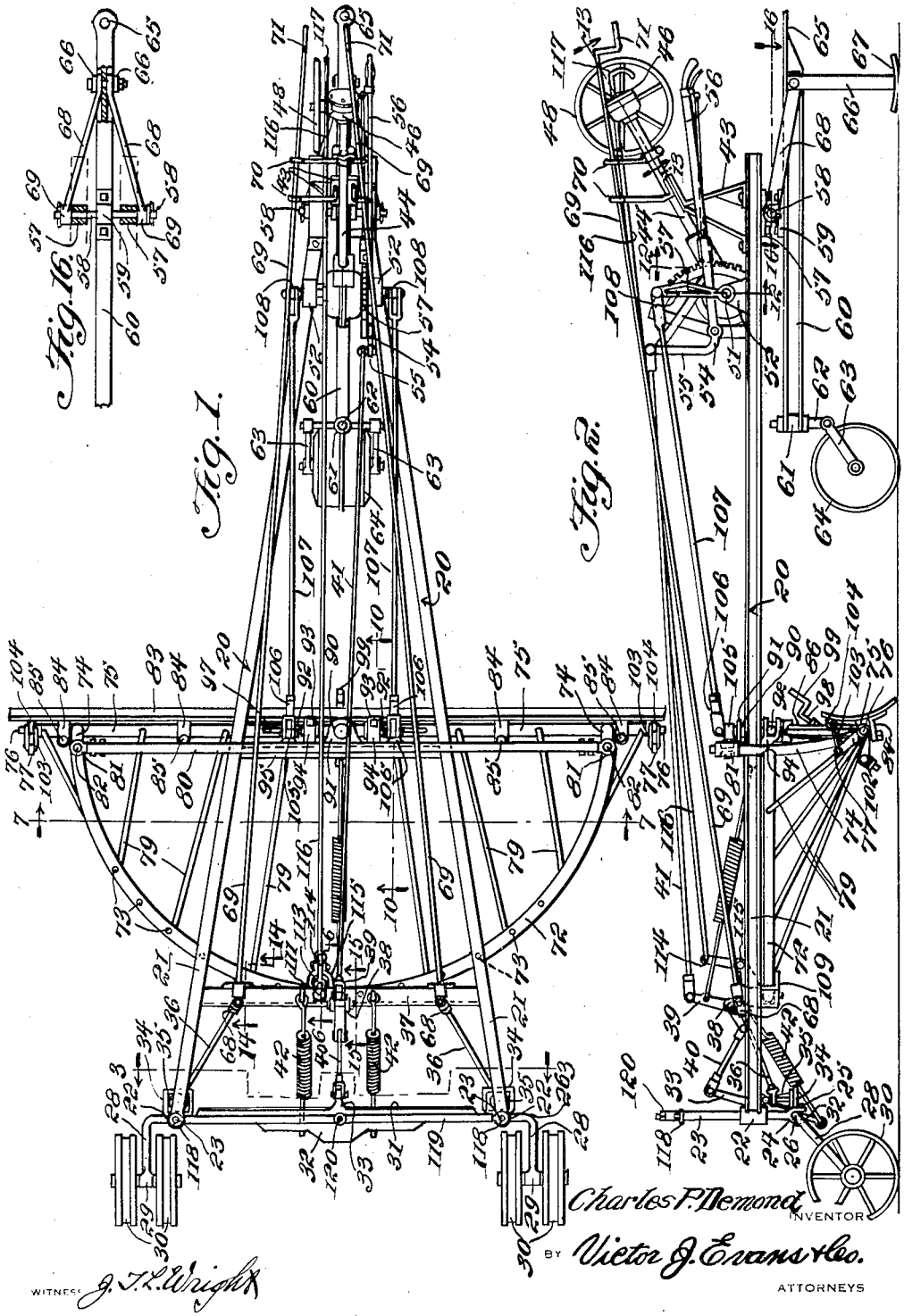
Charles P. Demond, INVENTOR
BY Victor J. Evans & Co., ATTORNEYS Nov. 9, 1943.  C. P. DEMOND  2,333,988
LAND LEVELING APPARATUS
Filed Dec. 10, 1941  3 Sheets-Sheet 2
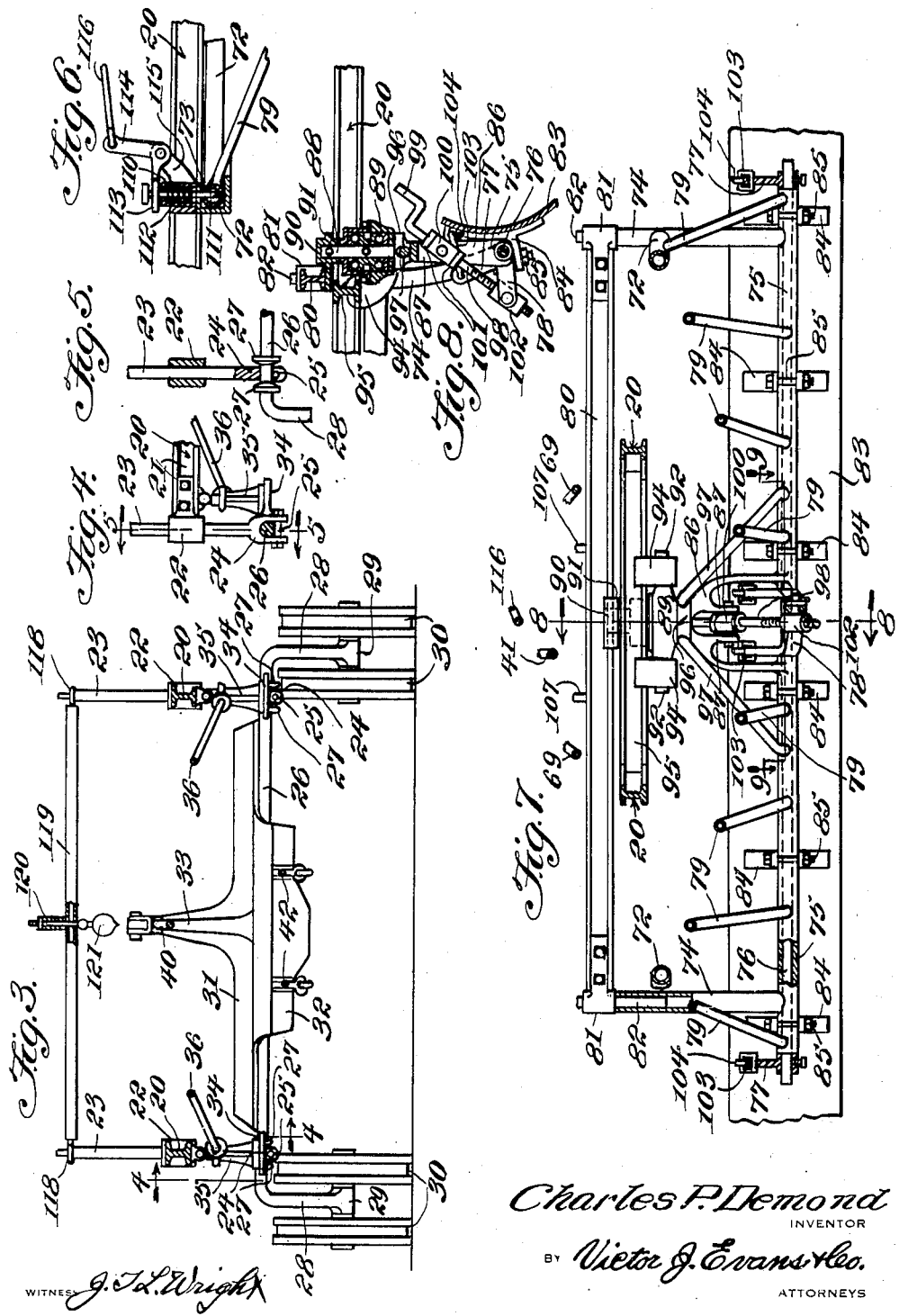
Charles P. Demond
INVENTOR
BY Victor J. Evans & Co.
ATTORNEYS
WITNESS J. T. L. Wright

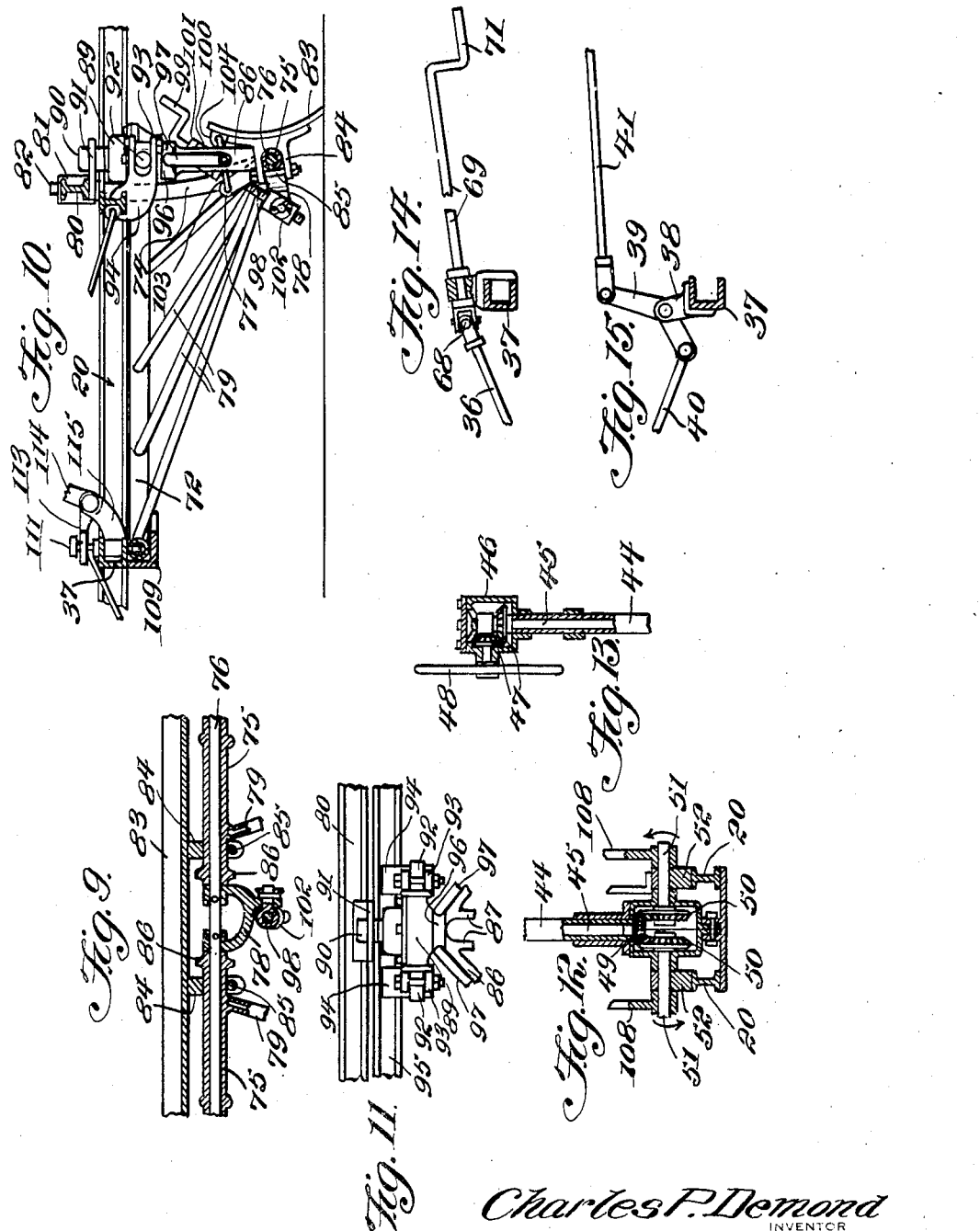

Patented Nov. 9, 1943

2,333,988

UNITED STATES PATENT OFFICE 2,333,988

LAND LEVELING APPARATUS

Charles P. Demond, Boise, Idaho

Application December 19, 1941, Serial No. 422,438

3 Claims. (Cl. 37—163)

The present invention relates to improvements in land leveling apparatus.

An object of the invention is to provide a land leveling apparatus of generally improved design.

Another object of the invention is the provision of land leveling apparatus having a universally adjustable leveling blade.

A further object of the invention is to provide a land leveling apparatus which is capable of use for a variety of leveling operations.

Still another object of the invention is the provision of land leveling apparatus which is designed to enable convenient adjustment of the blade from a single operating station.

A still further object of the invention is the provision of land leveling apparatus of the aforesaid character which is efficient and accurate in operation.

A still further object of the invention is to provide land leveling apparatus of the above character which is durable in construction and which may be readily attached to draft means.

Other objects and advantages of the invention will become apparent as the description progresses.

In the accompanying drawings forming a part of this specification and in which like numerals are employed to designate corresponding parts throughout:

Figure 1 is a top plan view of the complete apparatus,

Figure 2 is a side elevational view of the same,

Figure 3 is a transverse sectional view taken on line 3—3 of Figure 1,

Figure 4 is a fragmentary detail section taken on line 4—4 of Figure 3,

Figure 5 is a section taken on line 5—5 of Figure 4,

Figure 6 is a fragmentary longitudinal section taken on line 6—6 of Figure 1,

Figure 7 is a transverse section taken on line 7—7 of Figure 1,

Figure 8 is a fragmentary longitudinal section taken on line 8—8 of Figure 7,

Figure 9 is a fragmentary section taken on line 9—9 of Figure 7,

Figure 10 is a fragmentary section taken on line 10—10 of Figure 1,

Figure 11 is a fragmentary front elevational view of the structure shown at Figure 10, Figure 12 is a fragmentary vertical section taken on line 12—12 of Figure 2, Figure 13 is an enlarged section taken on line 13—13 of Figure 2, Figure 14 is an enlarged fragmentary section taken on line 14—14 of Figure 1, Figure 15 is a similar view taken on line 15—15 of Figure 1, and Figure 16 is a fragmentary horizontal section taken on line 16—16 of Figure 2.

Referring in detail to the drawings, wherein for the purpose of illustration is shown a preferred example of the invention, the main body frame of the apparatus is composed of a pair of longitudinal bars 20 having their forward portions parallel and joined in closely spaced relation while their rear portions 21 diverge, as clearly shown at Figure 1. At the rear ends of these bars are formed vertically disposed sleeves 22 slidably fitted on a pair of upstanding transversely spaced rods 23. The bottom end of each of this pair of rods is formed with a bearing yoke 24 fastened by a pin 25 on a rear transverse axle 26, to provide a pivoted and tiltable connection.

The axle is formed with collars 27 disposed at the sides of the bearing yoke and is shaped at each end to provide a right angular crank arm 28. At the outer end of the crank arm is formed a bearing sleeve 29 supporting a stub axle, on the opposed end portions of which are mounted rotatable ground wheels 30. Connected to the axle 26 intermediate its ends, by welding or the like, in opposed radial positions, is a pair of elongated webs 31 and 32, the former being shaped at its center portion to provide a radial normally upwardly projecting arm 33. On a flange 34 projecting laterally from the base portion of each rod 23 is fixed a jack 35 which may advantageously be of a screw type operable through the medium of gearing by an operating rod 36. Each of these jacks is disposed so that its vertically movable screw element is under and in engagement with the rear end portion of one of the longitudinal frame bars 20 and is operable to raise or lower the respective sides of the frame structure for vertically tilting the same.

On a channel bar 37 mounted transversely of the frame bars forwardly of the bar 26 is pivotally mounted, on a bracket 38, an angular lever 39 having one end connected to a link 40 and the opposite end connected to the rear extremity of an operating rod 41. The rear end of the link 40 is connected to the arm 33 for turning the rear shaft 26. To eyes on the bar 37 at each side of the lever 39 are connected the forward ends of a pair of tension coil springs 42 having their rear ends connected to eye projections attached to the lower axle web 32 and tending to yieldingly swing the axle web to a forward position. The link connection between the angular lever 39 and the link 40 tends to normally dispose the shaft arms 38 in downwardly and forwardly directed positions against the tension of the springs 42, as shown at Figure 2.

On the forward ends of the frame bars 20 is secured an upstanding bracket 43 which fastens these bars together and which forms an inclined seat for an angularly directed shaft housing 44 in which is journaled a drive shaft 45. On the forward elevated end of this housing is mounted a casing 46 enclosing a pair of intermeshing bevel gears 47 to one of which is connected, through a stub shaft, a vertically and longitudinally arranged hand wheel 48. At the rear end of the shaft 45 is secured a bevel pinion 49 mounted to mesh with a pair of complementary bevel gears 50 secured to transversely extending shaft sections 51 journaled in bearings 52. As seen from Figure 12 the pair of gears 50 are driven in reverse directions by the operation of the pinion 49 through the medium of the hand wheel 48 and impart corresponding rotation to the shaft sections 51. On an upstanding bracket 53 secured on the forward portion of the main body frame at one side of the gears 50 is pivotally connected an L-shaped lever 54 having a rear short arm 55 pivotally connected with the forward end of the operating rod 41. The longer arm 56 of this lever is shaped to form an operating handle equipped with ratchet mechanism operable to engage the notches of a toothed segment 57 for releasably locking the lever in set position.

Journaled transversely in bearings 57 secured to the under side of the frame bars 20 is a pivot pin 58 having its center portion extending through a bearing 59 secured on the intermediate portion of a subjacent supplementary frame bar 60. The frame forming bar 60 is arranged longitudinally below the forward portion of the main frame and carries, in a forward pivot bearing 61, the upstanding pivot stud 62 of a yoke 63 rotatably supporting a caster wheel 64. The forward end of the bar 60 is provided with an eye 65 adapted to afford a draft connection. Pivotally secured to this bar rearwardly of the eye 65 is a support bar 66, having an arcuate foot portion 67 at the outer end, designed to assume a vertical position for supporting the frame when the apparatus is detached from the draft means. To this pivot connection is also connected a pair of brace rods 68 having their rear divergent ends connected to bearing collars 69 disposed on the pin 58 against the outer ends of the bearings 57.

The forward end of each jack rod 36 is connected, through the medium of a universal joint 68, with a longitudinal extension rod 69 supported on guide brackets 70 and terminating in a hand crank 71 at one side of the hand wheel 48, for remote operation of the jacks 35.

On the intermediate portion of the body frame is mounted a blade supporting assembly embodying an arcuate semi-circular member 72 formed of metallic tubing and provided at spaced intervals with apertures 73. This segmental member is disposed horizontally below the frame bars and has the forwardly directed ends joined to the intermediate portions of a pair of upstanding tubular arms 74. The lower forwardly bent ends of these arms connect with the outer end portions of a pair of aligned bearing sleeves 75 separated at the center of the assembly. Within these sleeves is mounted a shaft 76 having secured on each projecting end a crank 77. To the center portion of this shaft is connected a yoke 78 having angular crank arms. A plurality of brace rods 79 are rigidly connected with the segment 72 and the sleeve sections 75 to connect and firmly brace the same. On the upper end portions of the arms 74 is supported a cross bar 80 having sleeves 81 formed with studs 82 slidably fitted in sockets in the upper portions of the arms. To the sleeves 75 is attached an elongated transversely curved blade 83 having bifurcated brackets 84 secured thereto and rotatably connected with the sleeves by removable fastening bolts 85.

To the inner ends of the sleeves 75 is connected an inverted U-shaped bracket 86 formed with a pair of spaced bearing lugs 87. This bracket is formed with an upstanding pivot stud 88 extending through a thrust bearing 89 and into a socket 90 connected to the cross bar 80 by a web 91. A pair of trunnions 92 extending transversely from the bottom section of the casing enclosing the bearing 89 are journaled in slotted yokes 93 of a pair of support clamps 94 fastened to a transverse bar 95 secured to and extending between the frame bars 20 below the bar 80. The upper portion 96 of the yoke 86 is fastened to the spaced sleeve sections 75 by a pair of oblique brace rods 97. As shown to advantage at Figures 7 and 8, a screw element 98 formed with a hand crank 99 at its upper forward end and screw threaded at the opposed end portion is rotatably supported in a bearing sleeve 100, pivotally mounted between the lugs 87, by means of thrust collars 101 fastened thereon. The lower threaded portion of this screw element engages a threaded sleeve 102 which is pivotally connected to the rearwardly directed portion of the yoke 78 so that, by operating the crank 99 in a clockwise direction the shaft 76 is turned in a counter-clockwise direction while reverse rotation of the crank turns the shaft in the opposite direction. The cranks 77, as well as upstanding arms on the yoke 78, are connected with the upper portion of the blade 83 through the medium of links 103 having their forward ends attached to the blade by eyes 104.

To a pair of spaced bearing eyes 105 attached to the bar 80 are connected the rear downturned pivot portion of a pair of angular connecting elements 106 formed with sockets threadedly engaging the rear ends of a pair of operating rods 107. The forward ends of these rods are pivotally connected to cranks 108 fastened on the transverse shaft sections 51.

The rearward portion of the segment 72 is slidably supported on an angle bar 109 secured to the under side of the transverse frame bar 87. On this latter bar is secured a cylindrical housing 110 in which is slidably fitted a shouldered pin 111 yieldingly depressed by a spring 112 to project the lower end of the pin into a selected aperture 73 of the segment, as shown to advantage at Figure 6. A forked arm 113 of a bell crank lever 114 pivoted on a bracket 115 engages under the head of the pin 111 for elevating the latter against the action of the spring 112. To the upstanding arm of the lever 114 is fastened the rear end of a longitudinally extending rod 116 terminating in an arcuate hook 117 at the front of the apparatus, for manual operation of the pin to lock the segment 72 in angularly adjusted position.

On the upper reduced ends of the upstanding rods 28 are fitted the looped ends 118 of an elevated cross bar 119 provided at its center portion with an adjustable connection 120 for the depending support line of a plumb bob 121.

During operation, the apparatus is connected to and drawn by a tractor or other suitable draft means attached to the forward end 65 of the draft bar 60, this bar functioning as a pivoted equalizing subframe. The leveling blade 83 may be turned or transversely adjusted to obtain the desired transverse inclination thereof by rotation of the screw 98 through the medium of the crank 99 which enables pivotal movement of the blade with relation to the sleeve sections 75 secured to the blade supporting frame structure. The leveling blade 83 may also be vertically tilted with reference to the plane on which the carrier wheels are supported by selective operation of one or both of the jacks through the medium of the hand cranks 71 to incline the body frame with reference to the shaft 26. Furthermore, the blade may be angularly adjusted in a plane parallel with the plane of the body frame by rotation of the hand wheel 48, which, through the instrumentality of the gearing 47 and 50, reversely rotates the shaft sections 51 to swing the cranks 108 and, through the intermediacy of the rods 107, swings the blade assembly about the axis of the pivot stud 88, to obtain a desired horizontal blade angle. Whenever necessary the blade may be vertically moved or translated by operation of the hand lever 54 which, through its connection with the rear axle 26, rotates the latter to raise or lower the rear end of the body frame about the pivot 58, through angular movement of the cranks 28.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In leveler apparatus, a wheeled frame, a segmental member supported for angular turning movement under the frame, a pair of vertical members attached to each end of the segmental member, a pair of aligned sleeves secured to the vertical members and to the segmental member, a leveling blade pivotally connected with the said sleeves, a shaft journaled in the sleeves having a central portion extending between inner spaced portions of the sleeves, a bracket attached to the inner portions of the sleeves and supported by a pivot bearing attached to the frame, means for selectively turning the shaft in the sleeves, and means connecting the said shaft with the blade for transversely tilting the latter upon turning of the shaft.

2. In an apparatus of the character described, a body frame, a crank axle disposed transversely of the frame, a pair of upstanding guide elements pivotally connected with the axle, the rear end of the frame having a sleeve at each side slidably fitted on the respective guide elements, a longitudinally extending wheeled auxiliary frame pivotally connected with the forward portion of the body frame, means for manually turning the rear axle for vertical adjustment of the frame, manually operable means for vertically adjusting each side of the frame relative to the rear axle for tilting the frame, a blade support assembly pivotally connected with the body frame, manually operable mechanism for angularly turning the said blade support assembly on the body frame, and a leveling blade attached to the said blade supporting assembly.

3. In an apparatus of the character described, a body frame, a crank axle disposed transversely of the frame, a pair of upstanding guide elements pivotally connected with the axle, the rear end of the frame having a sleeve at each end slidably fitted on the respective guide elements, a longitudinally extending wheeled auxiliary frame pivotally connected with the forward portion of the body frame, means for manually turning the rear axle for vertical adjustment of the frame, manually operable means for vertically adjusting each side of the frame relative to the rear axle for tilting the frame, a blade support assembly pivotally connected with the body frame, manually operable mechanism for angularly turning the said blade support assembly on the body frame, a blade pivotally connected with the support assembly below the body frame, and means for selectively adjusting the said blade to transversely tilt the same.

CHARLES P. DEMOND.